(No Model.) 2 Sheets—Sheet 1.
W. E. WALSH.
MEANS FOR TRANSMITTING POWER.
No. 487,805. Patented Dec. 13, 1892.
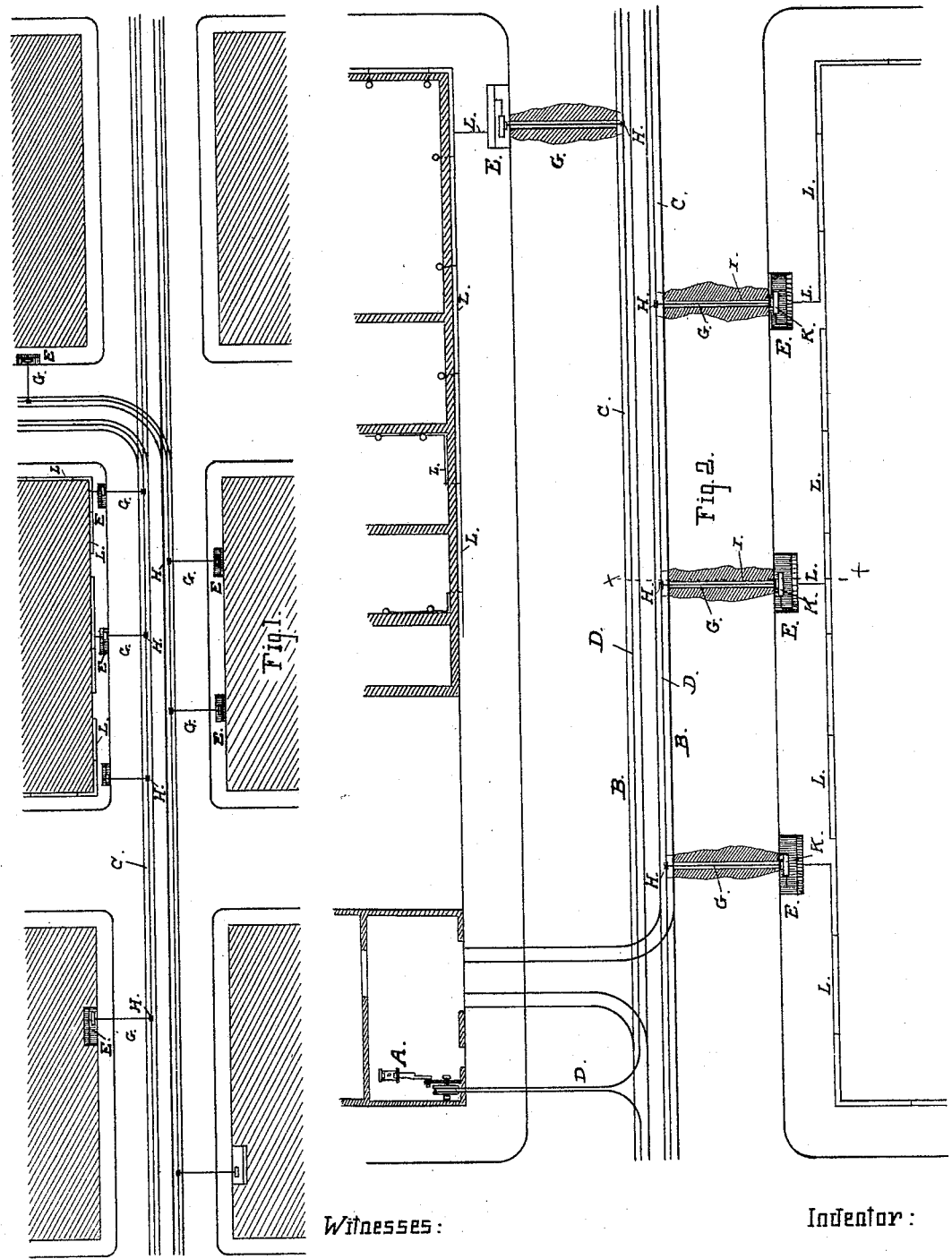

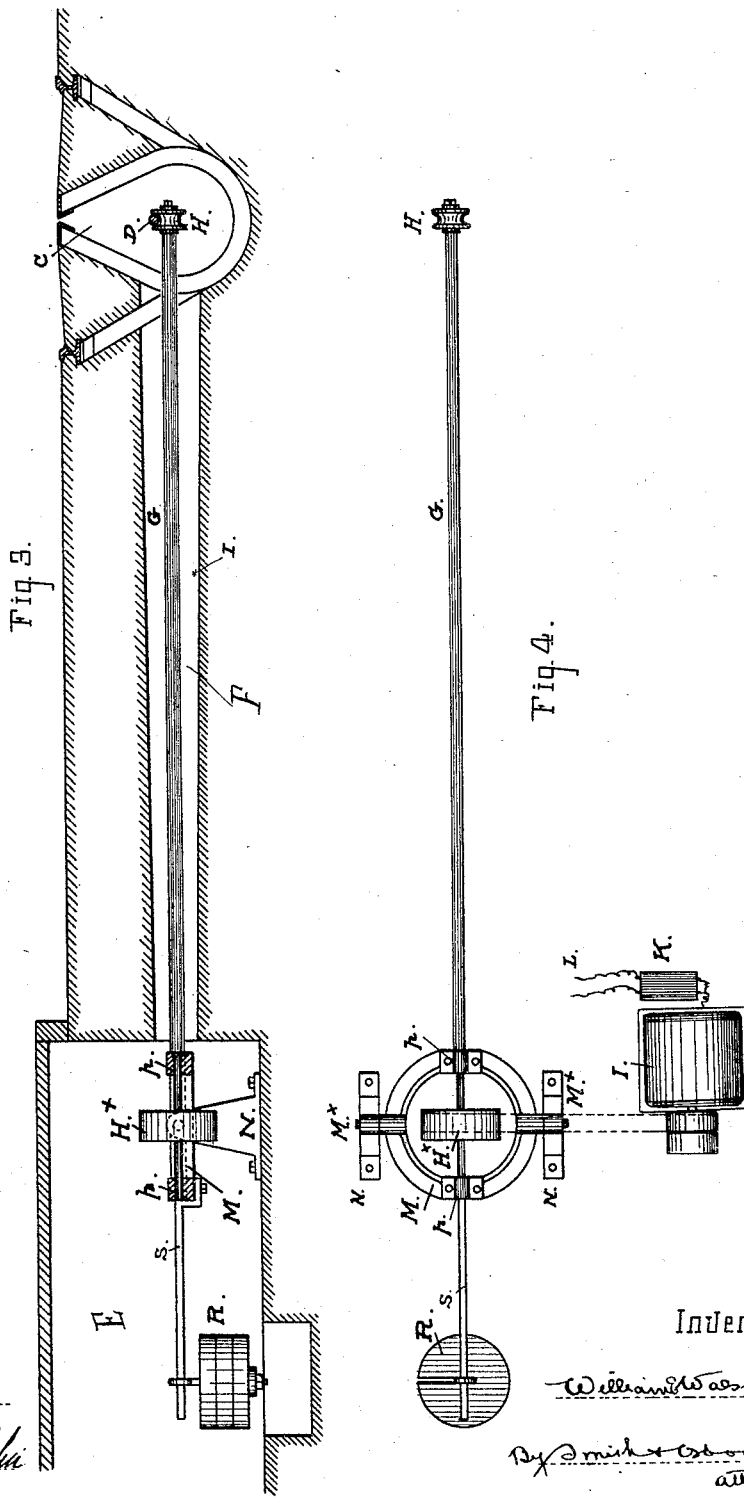

UNITED STATES PATENT OFFICE.

WILLIAM E. WALSH, OF SAN FRANCISCO, CALIFORNIA, ASSIGNOR OF ONE-HALF TO WILLIAM B. CRAIG, OF SAME PLACE.

MEANS FOR TRANSMITTING POWER.

SPECIFICATION forming part of Letters Patent No. 487,805, dated December 13, 1892.

Application filed May 2, 1892. Serial No. 431,451. (No model.)

*To all whom it may concern:*

Be it known that I, WILLIAM E. WALSH, a citizen of the United States, residing in the city and county of San Francisco, State of California, have invented an Improved Means for Transmitting Power; and I do hereby declare that the following is a full, clear, and exact description of my said invention, reference being had to the drawings that accompany and form part of this specification.

My invention has for its object to utilize the waste or surplus power of the cable and propelling apparatus of a cable-railway system in the production of electricity, and to distribute the same to houses and buildings contiguous to the line of a cable railway for motive power and for lighting purposes, whereby I am enabled to supply electricity at comparatively-small cost to a neighborhood or locality, as hereinafter set forth.

To this end and object I combine and arrange for operation with the propelling cable and apparatus of a cable road a dynamo-electric machine and mechanism by which power is transmitted from the propelling-cable to drive the machine; also, a storage-battery or several batteries and conductors to distribute the electricity to parts for consumption or use.

The following description explains the nature of my said invention and the manner in which I carry out and set up the same for operation and use, the accompanying drawings being referred to therein by letters.

Figure 1 is a plan or diagram representing my said system arranged to supply electricity to several blocks along the line of a cable road. Fig. 2 represents, on an enlarged scale, the end of the road at the engine-house. Fig. 3 is a vertical section, on an enlarged scale, taken through one of the vaults or chambers and across the cable-carrying tube. This section would be about on a line $xx$, Fig. 2. Fig. 4 is a top view of the driving-shaft and its carrier, the "dynamo," and the storage-battery, which are placed in the vault or chamber.

I make use of the stationary engine, propelling-cable, the cable-tube, and other necessary parts of the car-propelling apparatus of a cable road without materially changing or altering the same and without interfering in any manner with the regular operation of the road. In connection and combination with these parts I construct or set up at points or stations along the line of the cable road a vault or a chamber E convenient of access from the street, and from this chamber I carry into the cable-tube or ropeway a driving-shaft G, having a sheave or pulley H on the end inside the cable-tube to run in contact with the cable and to rotate the shaft by such contact. To this shaft within the chamber is connected by belt and pulleys or other suitable connecting means a dynamo-electric machine, which is set up in the chamber to be driven by that shaft, and in connection with the dynamo I place either in the same chamber or in another location convenient to the machine a storage-battery K or several storage-batteries, according to the size of the machine and the quantity of electricity required for distribution. Conducting-wires L are arranged and connected in proper manner to carry the electricity from the chamber to various points or localities for consumption or use. These parts and mechanism constitute an apparatus and system by which I am enabled to furnish electricity at very small expense and with no care or special attention on the part of the consumers along the line of a cable road.

In applying and operating my said system or invention I proceed to construct along the line of the road and wherever electricity is to be supplied for use a dynamo station or stations, usually under the surface of the street and at the line of the sidewalk, either by making a special excavation E for the purpose, as I have illustrated in Figs. 2 and 3, or by utilizing the vault or cellar of a building extending underneath the sidewalk, where such is already at hand and in convenient relation to the cable tube or ropeway, as indicated at E E, Fig. 1. I connect this chamber with the ropeway by a cross tunnel or passage F, in which I set the shaft G, having at the end in the chamber suitable coupling or connection with the shaft of the dynamo and on the opposite end within the ropeway the sheave or pulley H. In order not to interfere with the gripping apparatus of the cars, I set the pulley to run in contact with the cable from below, and to maintain working contact with the cable under the vibrations and variations of the cable when in motion I apply mechanism of some kind to keep the pulley up against the cable and at the same time permit it to yield and move in a vertical direction in order that the gripping apparatus of the cars may pass the pulley without difficulty.

The dynamo-chamber is accessible from the surface of the street through a trap-door in the sidewalk or from the cellar of the building in front of which it is located.

Ordinarily I set storage-batteries K in the same chamber with the dynamo; but in some cases it may be desirable to place the storage-batteries outside the chamber and then make proper connections between them and the dynamo, and I do not confine myself to the above-described arrangement of a dynamo and a storage-battery in the same chamber. In the accompanying drawings, A indicates the stationary engine of a street-cable railway of ordinary construction; B B, the tracks; C C, the cable-tubes or ropeways, and D the endless traveling cable. E is the vault or chamber, F the connecting-passage, and G the shaft extending from the chamber through the passage to the cable. The sheave or pulley H on this shaft is held in working contact with the cable and by its motion drives the shaft. I use an ordinary dynamo-electric machine of suitable power and connect it with the shaft G. The storage-batteries are properly connected to the dynamo, and from them the conductors L L are carried from the chamber to supply the electricity to the houses or other points for use.

To insure working contact with the cable under all conditions and at the same time allow the pulley to move in a perpendicular direction, as before mentioned, I employ the construction represented in Figs. 3 and 4 of the drawings, in which M is a yoke mounted on centers $M^\times M^\times$ between posts or pillow-blocks N N and having journal boxes or bearings $p\ p$ for the shaft. The pulley H on the outer end of this shaft is held up in contact with the cable by the counterweight R, and a second pulley $H^\times$ is fixed on that part of the shaft between the bearings $p\ p$ for driving the dynamo. The counterweight R is applied to the yoke M on the opposite side of the centers $M^\times$ by the arm S to hold up the outer end of the shaft and keep the pulley against the cable, and at the same time allow the shaft to move perpendicularly, as the vibrations of the cable require.

It should be mentioned that springs may be substituted for the counterweight to accomplish the same purpose. By this means the driving-pulley is kept in contact with the traveling cable without much loss or waste of power, as the pulley will follow any vertical movements of the cable, as the weight R at the opposite end of the rod G will serve to keep the pulley H constantly bearing against the cable, as is evident. This contact of wheel H with the running cable continues unless interrupted by the passage of the grip or other means secured to a cable for the purpose of propelling a car. The upward movement of the shaft G is limited by any suitable means, so that a grip in its passage will lift the cable off or raise it from the wheel H a sufficient distance to permit the grip to pass over the wheel without doing damage. When the grip passes the wheel, the cable will again assume its contact with the wheel H.

Having thus fully described my invention, what I claim, and desire to secure by Letters Patent, is—

1. In combination with the propelling-cable of an endless-cable railway, the shaft G, having a sheave or pulley H in contact with the cable, the pivoted yoke or carrier M, boxes for the shaft, weight R applied to the said carrier to counterbalance the weight of the shaft and its pulley, supports for said yoke, pulley $H^\times$ on said shaft, a dynamo, belt for connecting said pulley with said dynamo, and a storage-battery, all constructed and arranged substantially as and for the purpose set forth.

2. In combination with the propelling-cable of an endless-cable railway, the shaft G, having a sheave or pulley H in contact with the cable, the pivoted yoke or carrier M, supporting said shaft, weight R applied to said carrier to counterbalance the weight of the shaft and its pulley, pulley $H^\times$ on said shaft, and a dynamo connected to said pulley, all constructed and arranged substantially in the manner and for the purpose set forth.

3. In combination with the propelling-cable of an endless-cable railway, the shaft G, having a sheave or pulley H in contact with the cable, the pivoted yoke or carrier M, having boxes for the shaft, and a weight R applied to the said carrier to counterbalance the weight of the shaft and its pulley, substantially as hereinbefore described.

In testimony that I claim the foregoing I have hereunto set my hand and seal.

WILLIAM E. WALSH. [L. S.]

Witnesses:
EDWARD E. OSBORN,
CHAS. E. KELLY.